United States Patent [19]
Roark

[11] 3,771,854
[45]*Nov. 13, 1973

[54] MULTIPLE TORQUE TUBE SYSTEM FOR VARIABLE VIEW MIRRORS

[76] Inventor: Glenn L. Roark, 17164 Santa Clara, Fountain Valley, Calif.

[ * ] Notice: The portion of the term of this patent subsequent to Nov. 13, 1988, has been disclaimed.

[22] Filed: Sept. 11, 1968

[21] Appl. No.: 758,982

[52] U.S. Cl. .............................. 350/304, 248/486
[51] Int. Cl. ............................................ G02b 5/08
[58] Field of Search .................... 350/305, 306, 304; 248/200, 202, 474–477, 479, 486

[56] References Cited
UNITED STATES PATENTS

| 393,678 | 11/1888 | Wiederer | 350/306 |
| 1,088,765 | 3/1914 | Booth | 350/305 |
| 3,160,109 | 12/1964 | Kline | 103/162 |

Primary Examiner—David Schonberg
Assistant Examiner—Michael J. Tokar
Attorney—Bruce D. Jimerson

[57] ABSTRACT

A foldable mirror system employing a unique combination of structural mechanisms for allowing mirrors to be adjusted with respect to each other in a degree of unrestricted movement about vertical axes. The mirrors are maintained in rigid structural relationship with each other while the mechanism is adapted to fold into a compact space behind the mirrors when in the stored position.

1 Claim, 5 Drawing Figures

PATENTED NOV 13 1973

INVENTOR.
GLENN L. ROARK
BY John A Duffy
ATTORNEY

MULTIPLE TORQUE TUBE SYSTEM FOR VARIABLE VIEW MIRRORS

Foldable mirror structures utilizing two or more mirrors are in demand for uses such as in a dressing room to allow a person to position himself between mirrors to view his head from all angles. A wide flexibility in adjustment of the mirrors is essential for proper viewing. It is also highly desirable that rigid structural qualities are maintained without restricting adjustment motion. Additionally a compact structure is necessary to meet many requirements.

Foldable mirrors presently in use have undesirable characteristics which limit their versatility and use. Some structures designed for rigidity and compactness are severly limited in adjustment. Other structures designed for universal adjustment are wholly lacking in the necessary structural rigidity and compactness. Accordingly it is an object of this invention to provide an unrestricted movement for an adjustable mirror system.

It is another object of this invention to provide an adjustable mirror system adapted for compact storage so as to not be obtrusive when viewed from the side.

It is still another object of this invention to provide an adjustable mirror system in which two mirrors may be adjusted unrestricted to a degree about vertical axes toward and away from, and in a turning relationship to each other. The vertical turning axis of the mirror does not follow a set radius from the vertical turning axis at the wall.

Other objects of invention will become apparent when taken with the accompanying specification and drawing in which.

According to a principal aspect of the invention there is provided a mirror structure of triplex arrangement in which a central mirror is rigidly mounted to two horizontal beams. These beams are attached to a supporting structure such as a wall or the like. The central mirror with the two beams is the supporting structure for the two side mirrors with their adjustable supporting mechanisms. The supporting mechanisms for the two side mirrors allow a degree of unrestricted movement about multiple vertical axis with respect to each other while maintaining structural rigidity. This movement includes the pivoting of both side mirrors radially toward and away from each other and radially, toward and away from the supporting wall or like.

Another feature of this invention is its ability to support a mirror when extended over an obstacle such as a vanity without external influence other than the supporting wall or the like to which it is attached.

Figure 1:
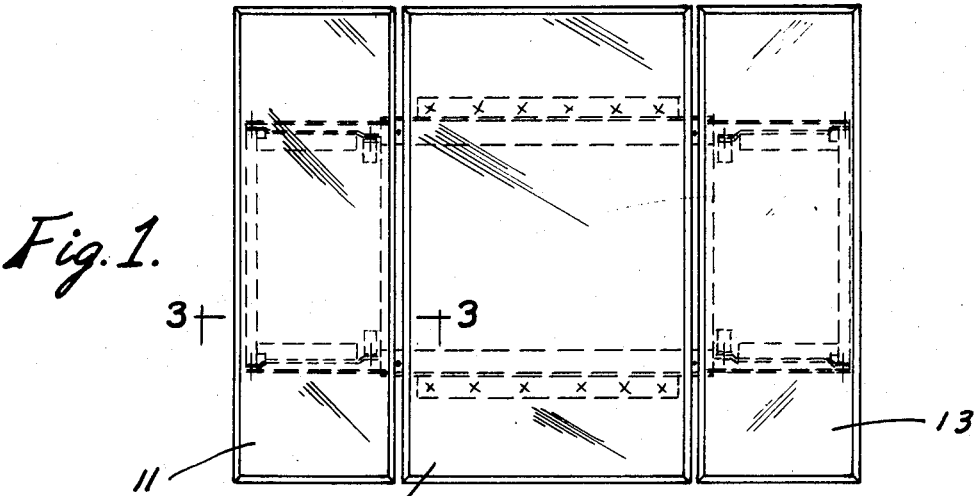
FIG. 1 is a frontal elevation view of a mirror structure according to the invention showing a triplex mirror structure in its stored position.

Referring now to the drawing there is illustrated in FIG. 1 a frontal elevation view of a mirror structure according to one aspect of the invention in which a triplex mirror device is shown in its stored position. A central mirror 12 is coplanar with two side mirrors 11 anD 13. The supporting structure for the central mirror 12 and the two side mirrors 11 and 13 is shown in phantom, and in a hidden stored position.

Figure 2:
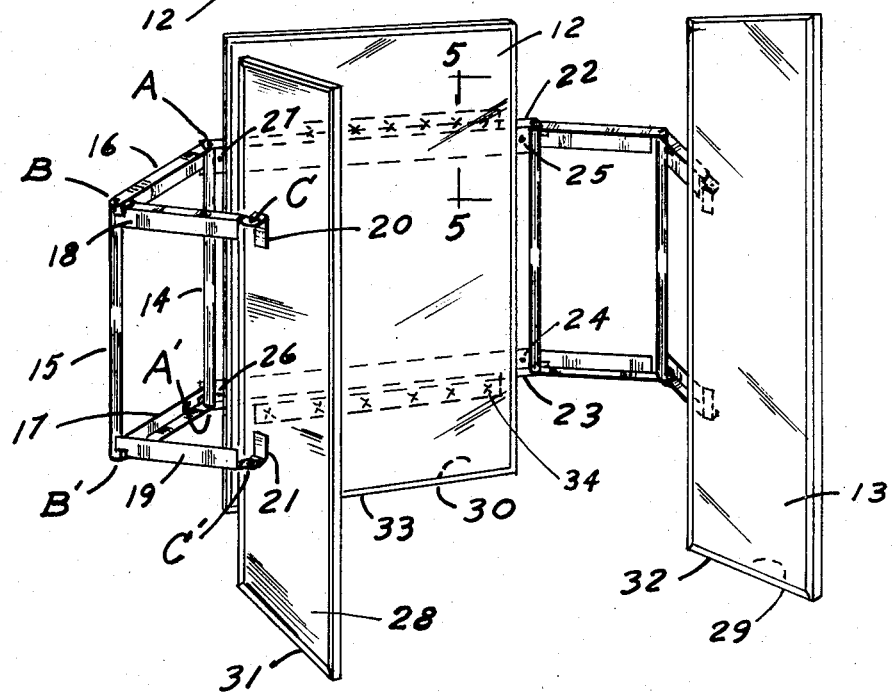
FIG. 2 is a perspective view of the triplex mirror structure of FIG. 1 shown in its extended position ready for use.

In FIG. 2 the two beams 22 and 23 are rigidly attached to a backing plate 30. The plate 30, the filler 38 and the central mirror 12 are rigidly held together by a metal, wood or plastic frame 33.

Figure 3:
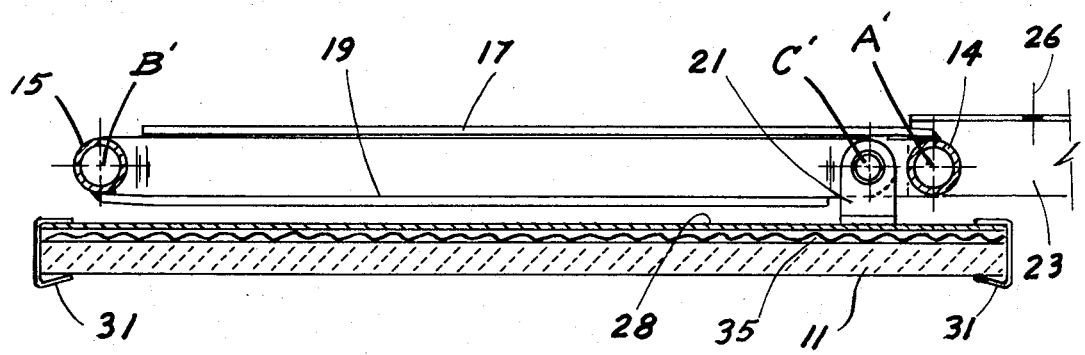
FIG. 3 is a top section view taken along the lines 3—3 of FIG. 1.

In FIG. 3 side mirror 11 and filler 35 is rigidly held to backing plate 28 by frame 31. The same view with the exception of being opposite applies to mirror 13. Mirrors 11 and 13 are identical. Hinge axes AA', BB', and CC' are coplanar thus providing compact storage. Transverse angle arms 16 and 17 as seen in FIG. 2 are rigidly attached to torque tube 14 both at their horizontal and vertical sides by welding or brazing. Transverse angle arms 18 and 19 are rigidly attached to torque tube 15 both at their horizontal and vertical sides by welding or brazing. The vertical legs of transverse angle arms 16 and 17 are maintained in a coplanar relationship by torque tube 14 when acted upon by eccentric loads at axis BB'.

The vertical legs of transverse angle arms 18 and 19 are maintained in a coplanar relationship by torque tube 15 when acted upon by eccentric loads at axis CC'.

Due to the resistance of the torque tubes 14 and 15 to eccentric forces the axis AA', BB', and CC' are maintained in vertical and parallel relationship regardless of their position with respect to each other. When the side mirror 11 is moved, axis CC', the vertical turning axis, does not follow a set radius about axis AA'. Therefore axis CC' moves substantially laterally in an unrestricted movement. Thus the side mirror 11 can be moved with better structural support and more efficient viewing.

Arm assembly 14, 16, and 17 is hingedly attached to central mirror beams 22 and 23 at axis AA'. Arm assembly 15, 18, and 19 is hingedly attached to arm assembly 14, 16, and 17 at axis BB'.

Side mirror backing plate 28 is rigidly attached to angle clips 20 and 21. Angle clips 20 and 21 are hingedly attached to arm assembly 15, 18, and 19 at axis CC'.

Figure 5:
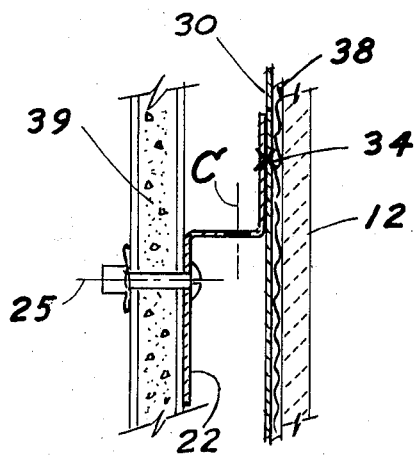
FIG. 5 is a typical view for all the mounting holes of FIG. 2.

Mounting holes 24, 25, 26, and 27 are provided for rigidly attaching the entire assembled unit to a supporting wall 39 or the like as shown in FIG. 5. Standard commercial wall anchors are shown in FIG. 5 at 25. FIG. 5 is a typical view for all mounting holes 24, 25, 26, and 27 shown in FIG. 2. Item 34 represents spot welds since backing plate 30 and beams 22 and 23 are light gauge sheet metal.

Figure 4:
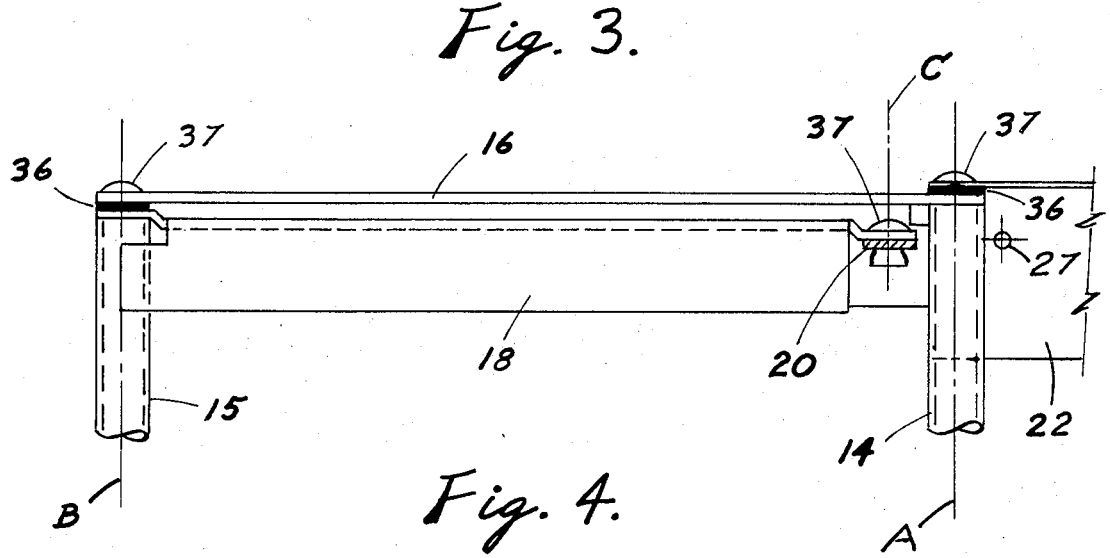
FIG. 4 is a frontal elevation of both arm assemblies in a stored relationship.

FIG. 4 is a frontal elevation of both arm assemblies in a stored relationship. The side mirror is omitted and only the top portion of the arm assemblies with an end of beam 22 is shown. The spacers 36 are commercial brass washers and hinge pintles 37 are commercial blind rivets.

Transverse arms 16, 17, 18, and 19 consist of angles with horizontal and vertical legs. Their horizontal legs are coplanar with the ends of the torque tubes 14 and 15. Their vertical legs lie adjacent to the outside surface of the torque tubes in the longitudinal direction of the torque tubes.

Although the invention has been described and illustrated in detail, it is to be clearly understood that the same is by way of illustration and example only and is not to be taken by way of limitation, the spirit and scope of this invention being limited only by the terms of the appended claims.

I claim:
1. A triplex mirror system comprising:
a center mirror;
means for mounting said center mirror in a vertical plane;
a side mirror on each side of said center mirror;
means for mounting said side mirrors in a vertical plane so as to permit said side mirrors to be rotated about a vertical axis without translating said side mirrors and also permit said side mirrors to be translated with respect to said center mirror without rotating said side mirrors about a vertical axis, said mounting means comprising:
a first set of links;
means for pivotally attaching said 1st links to said side mirrors so as to permit rotation; said points of attachment to be vertically displaced from one another;
a second set of links;
means for pivotally attaching one end of each of said 2nd links to one of said first links;
means for pivotally attaching the other end of said second links to said means for mounting said center mirror; whereby said side mirrors may be rotated with respect to the pivotal axis established by the connection of said side mirrors to said 1st links and whereby said side mirrors may be translated without rotation by changing the angular relationship between said 1st and 2nd links and the angular relationship between said 2nd links and said means for mounting said center mirror;
means for restraining said side mirrors in a vertical plane irrespective of their location and angle with respect to the plane of said center mirror, said restraining means comprising:
a first vertical tube;
a rigid attachment of the ends of said first links to said vertical tube;
means for pivotally attaching said vertical tube to the ends of said second links, and,
a second vertical tube;
a rigid attachment of the ends of said second links to said tube;
means for pivotally attaching said second tube to said center mirror mounting means whereby the force couple on said first and second link sets resulting from the weight of said side mirrors will be resisted by said first and second tubes.

* * * * *